VARIABLE PITCH LINEAR ACTUATOR
Original Filed Sept. 21, 1967 2 Sheets-Sheet 1
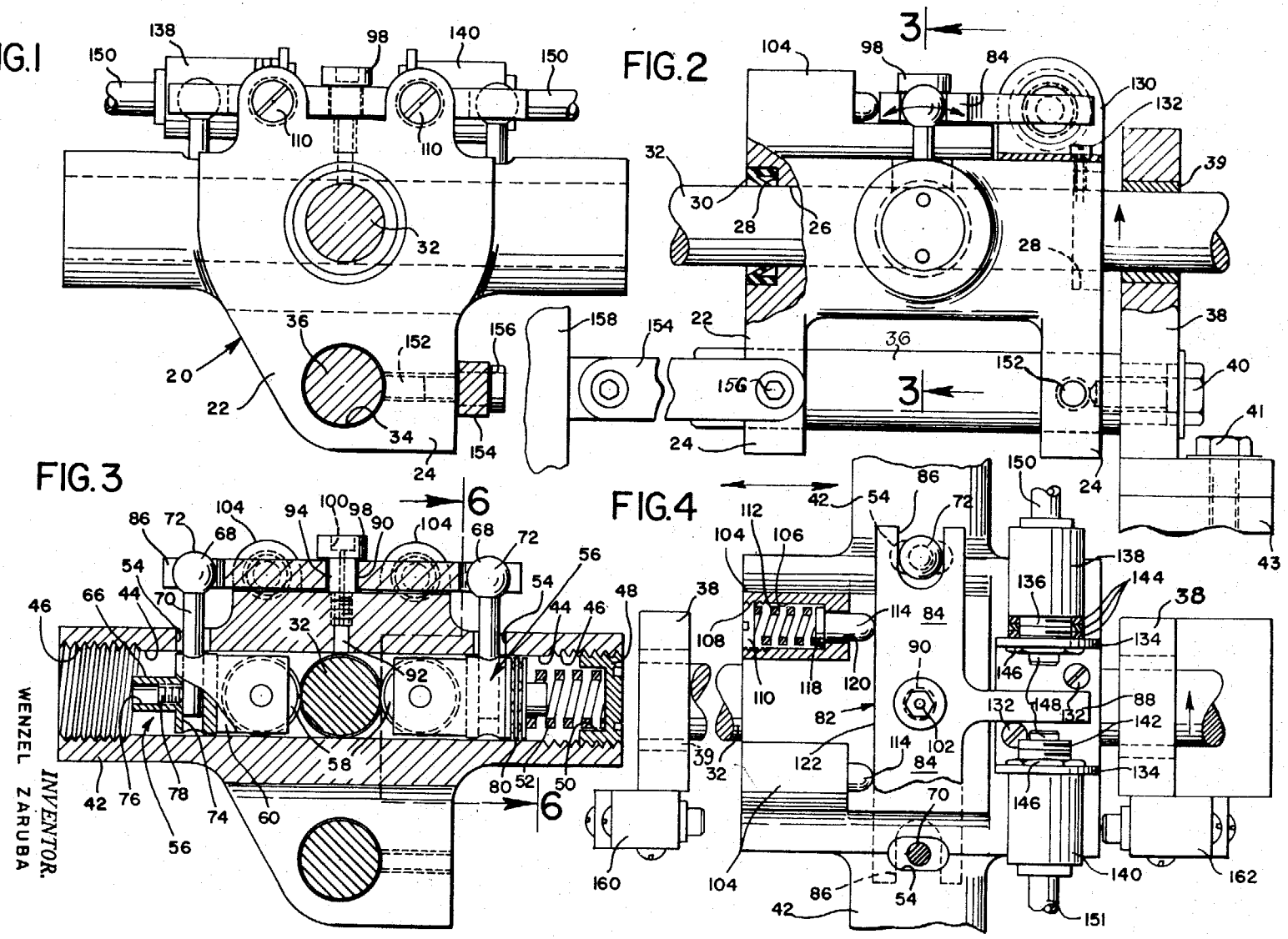
INVENTOR.
WENZEL ZARUBA
BY
Caesar, Rivise, Bernstein & Cohen
ATTORNEYS.

VARIABLE PITCH LINEAR ACTUATOR

Original Filed Sept. 21, 1967 2 Sheets-Sheet 2

INVENTOR.
WENZEL ZARUBA

BY

Caesar, Rivise, Bernstein & Cohen

ATTORNEYS.

United States Patent Office

Re. 27,403
Reissued June 27, 1972

27,403
VARIABLE PITCH LINEAR ACTUATOR

Wenzel Zaruba, East Paterson, N.J., assignor to The Dumore Company

Original No. 3,473,393, dated Oct. 21, 1969, Ser. No. 669,447, Sept. 21, 1967. Application for reissue Jan. 20, 1970, Ser. No. 4,253
Int. Cl. F16h *21/16*
U.S. Cl. 74—25 25 Claims

Matter enclosed in heavy brackets [ ] appears in the original patent but forms no part of this reissue specification; matter printed in italics indicates the additions made by reissue.

ABSTRACT OF THE DISCLOSURE

A variable pitch linear actuator for converting angular rotation to linear movement. The conversion is achieved by providing a plurality of wheels spaced about the periphery of a shaft, with the planes of said wheels being pivotable about axes perpendicular to the shaft.

This invention relates generally to linear actuators and more particularly to a means for converting angular displacement to linear displacement.

Conventional linear actuators are normally provided with a screw drive. That is, the linear actuating portion of the linear actuator is normally threadedly secured to the housing and it is displaced linearly as it is rotated. The disadvantage of such a linear actuator is that in order to change the proportion of linear displacement to angular displacement, it is necessary to change the pitch of the threads used on the surface of the shaft and the bore in which the shaft is rotated. Further, having fixed the factor by which the shaft is displaced linearly to the amount of angular rotation, the thrust of the shaft remains constant for the rate of rotation of the shaft. Moreover, in a conventional screw type linear actuator, in order to change the direction of movement linearly, it is also necessary to change the direction of rotation of the shaft. Thus, driving means must be provided which is bidirectional. Similarly, where the shaft is threadedly secured in the bore of the linear actuator, there is no overload protection. That is, the rotation of the shaft acts to drive the shaft linearly within the bore. Thus, in order to stop the shaft linearly, it is necessary to stop the rotation of the shaft or rotate the shaft in a direction opposite to that in which the shaft had been rotating. Otherwise, if an impediment is placed in the path of the shaft, the thrust thereagainst will build up until either the shaft stops rotating or the threaded engagement between the bore and the shaft breaks down. This is, of course, a safety hazard unless some form of overload protection is provided.

It is therefore an object of the invention to overcome the aforementioned disadvantages.

Another object of the invention is to provide a new and improved linear actuator which has variable pitch.

Another object of the invention is to provide a new and improved linear actuator which has a built in form of overload protection.

Another object of the invention is to provide a new and improved linear actuator with variable thrust.

Another object of the invention is to provide a new and improved ball bearing roller which enables a shaft to be linearly displaced with respect to said roller as said shaft is rotated.

Another object of the invention is to provide a new and improved linear actuator which enables unidirectional rotation of a shaft to be converted into linear displacement in either a first or a second direction.

These and other objects of the invention are achieved by providing in a linear actuator, a housing having an elongated cylindrical bore, an elongated cylindrical shaft, said shaft being rotatably mounted in said bore, said housing further including at least a first wheel, the periphery of which bears against the surface of said shaft, the plane of said wheel being rotatable about an axis extending perpendicularly to the axis of said shaft, said wheel being rotated when said shaft rotates in said cylindrical bore, said shaft being fixed longitudinally when the plane of the wheel is perpendicular to the axis of said shaft, said shaft being moved longitudinally along said bore as said shaft rotates when said plane of the wheel is displaced angularly from said position perpendicular to said axis of said shaft.

Other objects and many of the attendant advantages of this invention will be readily appreciated as the same becomes better understood by reference to the following detailed description when considered in connection with the accompanying drawings wherein:

FIG. 1 is a side elevational view of a linear actuator embodying the invention with parts shown in section;

FIG. 2 is a side elevational view taken from the right side of the linear actuator as shown in FIG. 1 with portions removed for purposes of clarity;

FIG. 3 is a sectional view taken along the line 3—3 in FIG. 2 with parts removed for purposes of clarity;

FIG. 4 is a top plan view of the linear actuator embodying the invention with parts removed and shown in phantom for purposes of clarity;

Referring now in greater detail to the various figures of the drawing wherein similar reference characters refer to similar parts, a linear actuator embodying the invention is shown generally at 20 in FIG. 1.

Figure 5:
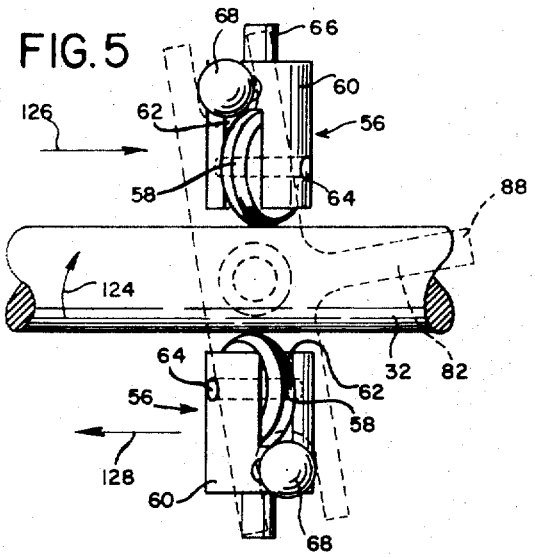
FIG. 5 is a top plan view of the ball bearing wheels and the shaft per se showing the cooperation therebetween with the T-bar shown in phantom.

The linear actuator 20 includes a housing 22 which is preferably of cast bronze. The housing may also comprise cast aluminum where lightness is a consideration or other conventional metals as the application requires. The housing 22 is generally rectangular and includes a pair of vertically depending legs 24. The housing 22 further includes a longitudinally extending bore 26 which is cylindrical and extends through the length of the housing. The bore 26 is enlarged in diameter at the ends 28 thereof. The enlarged ends 28 each include an oil seal 30 to prevent loss of lubricating oil which is used within the bore. A cylindrical longitudinally extending main shaft 32 is rotatably mounted in bore 26 and the outside diameter thereof is slightly smaller than the diameter of bore 26 to enable rotation of the shaft within the bore.

As best seen in FIG. 1, legs 24 of the housing 22 each include a cylindrical opening 34 which extends parallel to main shaft 32 and which are horizontally aligned with each other. A guide shaft 36 extends through both openings 34 in legs 24 and is slidably mounted therein and secured to a bearing block 38 by a threaded fastener 40. Threaded fastener 40 extends through an opening provided therefor in block 38 and is threadedly secured in the end of said guide shaft 36.

The main shaft 32 is supported by and is rotatably mounted in bearing blocks. As best seen in FIG. 2, the bearing blocks each have a main opening through which shaft 32 extends. A bronze bushing 39 is preferably proded in said opening to minimize wear. The bearing locks 38 are each secured by a threaded fastener 41 to an xternal support 43.

The guide shaft 36 not only provides additional support or said linear actuator, but also prevents the linear actuator from rotating with shaft 32. The housing 22 also includes a pair of cylindrical projections 42 which extend laterally out of said housing.

As best seen in FIG. 3, each of the projections 42 ncludes a cylindrical bore 44 which extends transversely o the bore 26 and which is common with said bore at he center of said housing. Bore 44 of each of the projections 42 is threaded at its outermost end 46. Adjustment uts 48 are threadedly secured in the ends 46 of the projections 42. Each adjustment nut 48 includes a cylindrical recess 50 in its innermost surface, in which an end of helical spring 52 is urged. Spring 52 and adjustment nut 8 act to vary the thrust imparted by shaft 32 to the housing 22 of the linear actuator. At the uppermost portion f each projection, a slotted opening 54 is provided which xtends through the uppermost surface of the projection 2 and communicates with the bore 44. In each of the rojections 42, a ball bearing wheel assembly is housed.

The ball bearing wheel assembly 56 comprises a ball earing wheel 58 which is rotatably secured in a yoke 60. s best seen in FIG. 5, yoke 60 is generally cylindrical nd includes a transversely extending slot 62 at its innermost end in which the wheel 58 is rotatably mounted. pin 64 extends through the legs of the yoke transersely to the direction of the slot 62 and is secured there- preferably by a pressed fit. The pin also extends through he wheel 58 and acts as an axis therefor for rotation. The oke also includes an axially extending projection 66 hich extends outwardly of the yoke 60.

Figure 6:
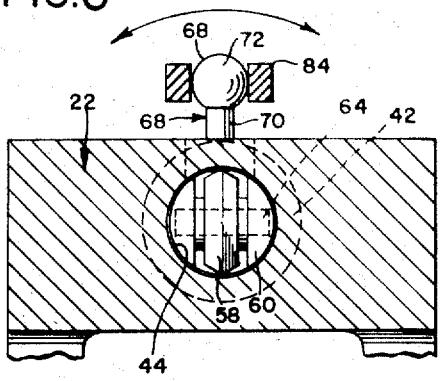
FIG. 6 is a fragmentary sectional view taken along the line 6—6 in FIG. 3.

As best seen in FIG. 6, each wheel 58 of the ball bearing wheel assemblies rotates in a plane about the axis hrough pin 64. The peripheral edge of the wheels is arcute to provide uniform frictional engagement with the haft against longitudinal movement with respect thereto. t can also be seen in FIGS. 5 and 6 that rotation of yoke 0 about its longitudinal axis causes the rotation of the lane of wheel 58 with respect to the longitudinal axis of he shaft 32. As will hereinafter be seen, the disposition of he plane of wheel 58 determines the linear movement of haft 32 with respect to housing 22 as shaft 32 rotates.

A ball end pin 68 is secured to the yoke 60 of each f the ball bearing wheel assemblies. As best seen in FIG. , the ball end pin 68 basically comprises an elongated pin 0 having a spherical enlarged head 72 at the end thereof. he pin 70 is secured in a transversely extending bore 4 that extends through yoke 60. As best seen in FIG. 3, rojections 66 of the yokes 60 have a threaded cylindrical bore 76 which extends axially through the projection nto the bore 74.

A threaded fastening member 8 is provided within ach bore 76 and is threadedly secured against the pin 70 o secure the ball end pin 68 to the yoke 60. The pins 70 f ball end pins 68 extend through the slotted openings 4 so that the spherical ends 72 of the ball end pins exend out of the projections 42 of the housing. The ball nd pins act as lever arms for the rotation of the ball earing wheel assemblies. That is, as best seen in FIG. 6, he yoke 60 is rotatably mounted in bore 44 of the projections 42 of the housing 22. Rotation of the ball end pin 8 thereby causes rotation of the plane of the ball bearing wheel 58.

As best seen in FIG. 3, the main portion of yokes 60 re spaced from the thrust springs 52 by thrust bearings 0. Each thrust bearing 80 includes an opening at the enter thereof which fits over the projection 66 of the oke 60. It can therefore be seen that the yoke of the all bearing wheel assembly is easily rotated about its ongitudinal axis in the bore 44 irrespective of the amount f compression placed on spring 52.

The adjustment nuts 48 determine the pressure applied by the thust springs 52 to the yoke 60 which is in turn applied to the wheels 58 which are urged at diametrically opposed portions of the surface of shaft 32. The pressure applied to the ball bearing wheels 58 determines the frictional engagement between the wheels and shaft 32. The frictional engagement between the wheels and shaft is proportional to the amount of thrust which can be imparted from the shaft to the housing of the linear actuator. That is, if a force is laterally applied to housing 22 in a direction parallel to the axis of the shaft, which is larger than the frictional engagement between the shaft and the wheels, the shaft can slip longitudinally in the bore 26 of housing 22. The larger the thrust desired, the more deeply are the adjustment nuts 48 screwed into bores 44 of projections 42. It should also be noted that by providing a large number of ball bearing wheel assemblies about the shaft, the maximum available thrust can be increased.

The enlarged sphere 72 at the end of the ball end pins are engaged by the arms of a T-bar 82. The T-bar 82 is substantially planar and includes a pair of arms 84 which each includes elongated slots 86 at the ends thereof.

As best seen in FIGS. 4 and 6, the enlarged spheres 72 of the ball end pins 68 extend into the elongated slots 86 and are thus embraced by arms 84 of the T-bar 82. The T-bar 82 also includes a leg 88 which extends transversely to arms 84. At the main portion between the arms 84 and leg 88 of the T-bar, there is provided a vertically extending cylindrical opening 90.

As best seen in FIG. 3, opening 90 is axially aligned with a vertically extending bore 92 which extends vertically into the central top portion of the housing 22. A cylindrical collar 94 which acts as a spacer is inserted into opening 90 and a washer 98 having a cylindrical recess 100 is provided thereabove. A shoulder screw 102, which is best seen in FIG. 4, is threadedly secured into bore 92 to secure the T-bar between the washer 98 and the top surface of housing 22. The T-bar 84 is thus pivotably mounted about the collar 94 and shoulder screw 102.

Also provided on the top of housing 22 are a pair of arch like vertically extending projections 104. As best seen in FIG. 4, each of the projections 104 includes a horizontally and longitudinally extending bore 106 which extends through the projection. Bore 106 is substantially cylindrical and is threaded at end 108 for reception of a threaded fastener 110. A helical spring 112 is axially inserted in bore 106 which bears against a pin 114. Pin 114 is substantially cylindrical and includes an enlarged base 118. The end 120 of bore 106 is smaller in diameter than the remaining portion of the bore and thus the enlarged base 118 of the pin acts as a shoulder to prevent the pin from being removed from the bore 106. However, the main portion of the pin 114 is long enough to extend through the smaller portion 120 of the bore 106 and projects to and is urged against the lateral surface 122 of the T-bar 82.

It can therefore be seen that pins 114 which are housed in projections 104 bear against lateral surface 122 equally spaced about the longitudinal axis through the T-bar 82. That is, the axis of pins 114 are each equally spaced from the axis about which the T-bar 82 is rotatably mounted. Therefore, the pins 114 act to urge T-bar 82 to its centralmost position so that the arms 84 thereof extend transversely to the longitudinal axis of the housing 22 and leg 88 of T-bar 82 extends longitudinally of the housing 22.

Referring now to FIG. 6, it can be seen that when the arms 84 of the T-bar 82 are in a position whereby they extend normally to the longitudinal axis of housing 22, the ball end pin 68 extends vertically thereby maintaining the plane of ball bearing wheel 58 vertically and perpendicular to the longitudinal axis of shaft 32. When the T-bar is rotated counterclockwise or clockwise about the axis through fastener 102, the ball end pins 68 travel with the arms 84 thereby causing the yokes 60 to rotate about their longitudinal axes which are normal to the axis of shaft 32 within bores 44 and thereby causes the planes of wheels 58 to be angularly spaced perpendicular to the axis of shaft 32. It can therefore be seen that as the wheel 58 rotates, it is angularly spaced from the plane perpendicular to the axis of the shaft, and the shaft 32 is therefore linearly displaced as it rotates about its longitudinal axis.

As best seen in FIG. 5, when the T-bar 82, which is shown in phantom therein for ease of reference, is rotated by leg 88 being angularly displaced from the longitudinal axis of the housing 22, the yokes 60 of the diametrically opposed ball bearing wheel assemblies are equally rotated about the longitudinal axis therethrough. The shaft 32 as it rotates causes the wheels 58 of each of the diametrically opposed assemblies to rotate. As the shaft 32 rotates, the shaft also moves linearly or longitudinally with respect to the housing 22 in accordance with the pitch or angular displacement of the wheels with respect to the plane normal to the axis of the shaft.

It can therefore be seen that the surface of the rotating shaft follows the direction of the wheels 58. If the plane of the wheels is perpendicular to the axis of the shaft, the shaft does not move linearly because the surface of the shaft follows the direction of the wheels. However, as the plane of the wheels is displaced from the plane normal to the axis of the shaft, the shaft is linearly displaced as it rotates. As the angle of displacement of the plane of the wheels or the pitch increases, the amount of linear movement with respect to the amount of rotation increases. Also, the direction of the angular displacement of the plane of the wheels determines the direction in which the shaft moves linearly with respect to the housing of the linear actuator. It should be understood, that if the shaft is linearly fixed, the housing moves along the shaft. Conversely, if the housing is fixed, then the shaft moves linearly.

Assuming therefore that the shaft 32 rotates in the direction of arrow 124 in FIG. 5 (e.g. the closest surface of the shaft to the viewer moves upwardly), the shaft travels in the direction of arrow 126 in FIG. 5 with the ball bearing wheels in the positions shown therein. However, by rotating the T-bar 82 so that the leg 88 is rotated clockwise, as shown in FIG. 5, the shaft 32 is linearly displaced in the direction of arrow 128.

A U-shaped mounting bracket 130 is secured to the top of housing 22 by a pair of threaded fasteners 132. The U-shaped bracket 130 includes a pair of planar upstanding rectangular legs 134 each having an opening therein. A threaded projection 136 of an air cylinder 138 is inserted in one of legs 134. Similarly, the threaded projection 142 of an air cylinder 140 is inserted in the opening of the other leg 134. It should be noted that provided about threaded projection 136 of air cylinder 138 are a plurality of washers 144 which space the air cylinder 138 from the center of bracket 130. The threaded projections 136 and 142 are secured to the legs 134 by threaded nuts 146. Cylinders 138 and 140 each include pistons 148 which are projected when air pressure is provided via air lines 150 and 151 to the cylinders 138 and 140, respectively.

It can therefore be seen that if air cylinder 138 receives air pressure via line 150, the T-bar 122 is rotated clockwise about the axis through fastener 102 thereby causing the pitch of the ball bearing wheels 58 to cause the linear movement of the shaft with respect to the linear actuator housing 22. The amount of clockwise rotation of the T-bar 82 is determined by the amount of air pressure provided to line 150. As soon as the air pressure to line 150 is released, the piston 140 is retracted and the pins 114 tend to return T-bar 82 to its normal position.

To change the direction of movement of the housing 32 with respect to shaft 22, air pressure is applied to line 151 of air cylinder 140 which causes the piston to project and rotate the T-bar 82 in a counterclockwise direction. The plane of the wheels 58 is thus angularly spaced from a plane normal to the shaft in the opposite direction thus causing the shaft to be linearly actuated in a direction opposite to that of the example hereinbefore stated.

The housing 22 of the linear actuator includes mounting openings 152 which are provided in projections 24 thereof. These openings 152 enable a load to be secured to the housing. Thus, as shown in FIGS. 1 and 2, a link 154 is secured to leg 24 by means of a threaded fastener 156 which is threadedly secured in opening 152 therein.

Link 154 is connected to a load 158 which is moved in accordance with the movement of the housing 22. The amount of movement of the housing 22 with respect to the shaft 32 is dependent not only on the angular rotation of the shaft, but also by the amount of pitch of the wheels 58. The washers which are provided between air cylinder 138 and leg 134 of the mounting bracket enable the plane of the wheels to be displaced at a larger angle by cylinder 140 than by cylinder 138. To prevent the linear actuator from being urged against the bearing blocks 38 when the housing approaches the same, microswitches are provided on the bearing block to actuate the air cylinder which changes the pitch of the wheels to the opposite direction which causes the linear actuator to move in an opposite direction.

As best seen in FIG. 4, a bearing block 38 is provided on each end of shaft 32. A first switch 160 is provided on the first bearing block and a second microswitch 162 is provided on the other of said bearing blocks.

Figure 8:
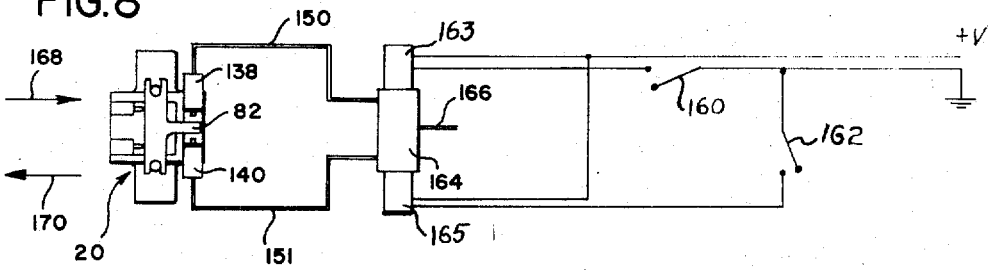
FIG. 8 is a schematic block diagram showing the control of said linear actuator.

As seen in FIG. 8, the switches 160 and 162 are connected to a four-way double solenoid air valve 164 having a pair of solenoids 163 and 165. A D.C. voltage +v. is selectively connected to solenoids 163 and solenoids 165 via switches 160 and 162, respectively. When the microswitch 160 has been pressed by the abutment of the lateral edge of the housing 22 of the actuator 20, the switch 160 is closed thereby energizing solenoid 163. The energization of solenoid 163 causes the four-way double solenoid air valve 164 to pass air from an incoming air line 166 via air line 150 to air cylinder 138.

When the linear actuator abuts switch 162, switch 162 is closed thereby energizing solenoid 165 of the air valve 164 which thereby enables the passage of air from line 166 to air line 151 which thereby causes the piston of cylinder 140 to rotate the T-bar in the opposite direction. Thus, as illustrated in FIG. 8, when the microswitch 160 is abutted, it is closed thereby causing the linear actuator 20 to travel in the direction of arrow 168 along the shaft 32. When the microswitch 162 is abutted, it causes the linear actuator to travel in the direction of arrow 170 along the shaft 32.

It can therefore be seen that the linear actuator may be moved along the shaft in either direction by merely changing the pitch of the ball bearing wheel assemblies. The shaft may continue to rotate in the same direction and yet the change of pitch of the ball bearing wheel causes the linear actuator to reverse its direction. The amount of movement of the linear actuator linearly with respect to the angular movement of the shaft may be changed by changing the pitch of the ball bearing wheel assemblies. Moreover, since the ball bearing wheels engage the shaft 32 only frictionally, the thrust can be varied by the changing of the amount of force urged against the shaft by the wheels. That is, by adjustment of the threaded member 48, the amount of pressure applied to the shaft by the wheel can be changed.

Figure 7:
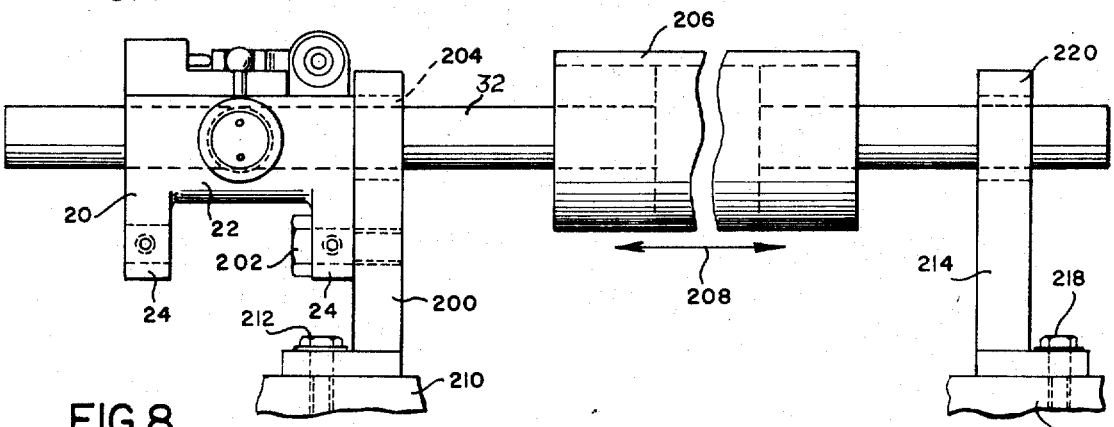
FIG. 7 is a side elevational view of an alternate embodiment of the invention wherein the housing is fixed and the shaft is movable.

An alternate system embodying the invention is shown in FIG. 7. Whereas, in the first embodiment, the shaft was fixedly secured linearly to bearing blocks 38, the linear actuator 20 is secured to a bearing block 200. Rather than providing a shaft 36 through the openings in legs 24 of the housing, a threaded fastener 202 is provided through the rightmost leg 24 to secure the same o the bearing block 200. The bearing block 200 also ncludes an opening having a bushing 204 through which he shaft 32 extends. Shaft 32 is secured to a roller 206 vhich may be moved in either of the directions of arrows 08. The bearing block 200 is secured to an external upport 210 by a threaded fastener 212. The shaft 32 is lso supported at its opposite end by a bearing block 14. Block 214 is supported by an external support 216 nd is secured thereto by a threaded fastener 218. An pening having a bushing 220 is provided in bearing lock 214 through which the shaft 32 extends and is otatably and slidably supported therein. Roller 206 is referably driven by materials such as cloth, paper or lastic and is thus usable in an edge guiding appliation.

It can therefore be seen that the linear actuator of he invention has many applications. It may be used for dge guiding in order to control a conventional web. It ıay also be used in such applications as hydraulic and ir cylinder replacement, hospital beds, power seats, inexing, elevators, feeder control equipment, printing resses, bus and streetcar doors, garage doors, aircraft assenger seats, power windows, radar antennas, precion tuning of electronic components, pedestrian doors, ower tail gates, sliding doors, etc.

The linear actuator of the invention is inexpensive to ıanufacture, but it is highly efficient. Moreover, the afety feature of variable thrust can prevent, for example, ı power window applications, the dismemberment or ıaiming as a result of an inadvertently placed finger vithin the window and the frame.

Without further elaboration, the foregoing will so ılly illustrate my invention, that others may, by applying urrent or future knowledge, readily adapt the same for se under various conditions of service.

What is claimed as the invention is:

1. A linear actuator comprising a housing having a ɔngitudinally extending cylindrical bore and a plurality f bores which extend perpendicularly to and into said ɔngitudinally extending bore, a shaft, said shaft being otatably and slidably mounted in said longitudinally exending bore, a plurality of cylindrical members, each f which is rotatably mounted in a different one of said erpendicular bores, each of said members having a ansversely extending slot at the end closest said shaft, plurality of wheels, each of which is rotatably mounted ı the slot of a different one of said cylindrical members, aid wheels being mounted in said cylindrical members ɔ that the end of said cylindrical member is spaced close- r to the outermost edge of said wheel, means for urging aid cylindrical member inwardly of said perpendicular ores so that said wheels bear against the periphery of aid shaft, said cylindrical members being substantially milar in diameter to the diameter of said perpendicular ores so that said wheels may not be deflected longiıdinally, the planes of said wheels being rotatable with aid cylindrical members, means for rotating the planes f said wheels to control the movement of said shaft ɔngitudinally with respect to said housing when said aft rotates with respect to said housing, said shaft eing fixed longitudinally with respect to said housing s it rotates when said plane of said wheels are moved erpendicular to the axis of said shaft, said shaft being ıoved longitudinally with respect to said housing as aid shaft rotates when said plane of said wheel is moved ɔ a position angularly spaced from said position perpeniicular to said axis of said shaft.

2. The invention of claim 1 wherein said means for rging said cylindrical member includes means for varyıg the frictional engagement between said shaft and said heels.

3. The invention of claim 2 wherein said means for rging said cylindrical member includes a spring which rges said cylindrical member towards said shaft and aid means for varying said frictional engagement between said wheel and said shaft comprises a threaded member which varies the compression of said spring by rotation thereof.

4. The invention of claim 2 wherein a thrust bearing is provided between said means for urging said cylindrical member and said cylindrical member, said thrust bearing enabling said cylindrical member to rotate with respect to said means for urging.

5. The invention of claim 1 wherein said means for rotating the planes of said wheels include lever arms which extend out of said housing and are operatively secured to said cylindrical members so that movement of said lever arm rotates the planes of said wheels, said lever arms being mechanically linked so that the planes of each of said wheels are disposed at the same angle with respect to the axis of said shaft.

6. The invention of claim 5 wherein said lever arms each includes a spherical end portion, said means for mechanically linking said lever arms including slotted openings in which said spherical portions are rotatably received, so that movement of one of said lever arms thereby causes the movement in the other of said lever arms so that said planes of said wheels are each at the same angle relative to the shaft.

7. In a linear actuator, a housing having an elongated cylindrical bore, an elongated cylindrical shaft being rotatably mounted in said bore, said housing further including a pair of rotatable assemblies, each of which extends perpendicular to the bore of the shaft, each of said assemblies including a wheel, said wheels being disposed diametrically opposite each other about said shaft and bearing against the surface of said shaft, the planes of said wheels being rotatably mounted about an axis which extends transversely to the longitudinal axis of the shaft, each of said wheel assemblies including lever arms which extend out of said housing and which are operatively secured to said assembly so that movement of the lever arm rotates the planes of said wheels, said shaft being fixed longitudinally with respect to said housing when said shaft is rotating if the plane of said wheel is perpendicular to the axis of said shaft, said shaft being moved longitudinally with respect to said bore as said shaft rotates when said plane of said wheel is displaced angularly from said position perpendicular to said axis of said shaft, and a T-shaped member having a pair of arms which engage said lever arms and a leg which extends transversely to said arms, said T-shaped member being pivotable about an axis which is perpendicular to the axis of said bores of said assemblies so that rotation of said leg of said T-shaped member varies the angular displacement of the planes of said wheels equally.

8. The invention of claim 7 wherein a pair of spring loaded pins are urged against each of said arms of said T-shaped member, said pins being spring urged so that said T-shaped member is biased to a central position wherein said arms extend parallel to the axis of said assemblies.

9. The invention of claim 7 wherein movable members are provided about the leg of said T-shaped member whereby actuation of either of said movable members moves said T-shaped member for changing the direction of said plane of said wheels for changing the direction of linear movement of said shaft.

10. The invention of claim 9 wherein one of said movable members is secured closer to said leg of said T-shaped member thereby enabling said shaft to move faster in one longitudinal direction than in the opposite direction.

*11. A device for converting a torque force into a linear force directed parallel to the axis of the torque force comprising, in combination: a rotatable shaft onto which a torque force is applied; a frame closely surrounding the shaft and defining therein a plurality of socket defining portions; each of said socket defining portions containing an elongated pivotable bearing housing;*

*a bearing of smaller exterior diameter than the diameter of said housing mounted in and substantially surrounded by said housing and said socket defining portion; each of said bearings having the periphery of its outer race engaging the periphery of the shaft, to be rotatably driven relative to said shaft about its own axis but being movable axially of the rotatable shaft; said bearing having surfaces in contact with said housing for transmitting forces to said housing; said housing having an exterior surface, at least a part of said surface is no farther from said rotatable shaft than the axis of said bearing and said part being in contact with said socket defining portion, for transmitting forces parallel to the axis of the rotatable shaft to said socket defining portion; pivot means for pivoting each bearing about the axis of the pivotable housing in which it is enclosed, so that a force component is transmitted from the rotatable shaft to the bearing and thence to the frame which is manifested by development of a force parallel to the axis of the shaft which tends to effect relative movement between the shaft and frame in directions axially of the shaft; and controller means for selectively effecting substantially identical pivoting of all bearings simultaneously.*

*12. A device as in claim 11 wherein the bearing is slidably mounted radially of the rotatable shaft in said socket defining portion and connecting means serving as the pivot axis of the bearing and extending outwardly of the frame and connecting said bearing to said controller means whereby the position of the bearing in said socket defining portion may be controlled by said controller means.*

*13. A device as in claim 11 wherein the pivot means for pivoting each bearing includes a pin associated with said bearings, and projecting generally transversely of the shaft to a point where it is engaged by the controller means.*

*14. A device as in claim 12 including selectively variable force means carried on the socket-defining portion and operatively engaging said bearing assembly.*

*15. A device for converting a torque force into a linear force directed parallel to the axis of the torque force comprising, in combination: a rotatable shaft onto which a torque force is applied, a frame surrounding the shaft, said frame including a plurality of similar bearings each having its outer race peripherally engaging the periphery of the shaft, to be rotatably driven relative to said shaft about its own axis but being movable axially of the shaft, pivot means for pivoting each bearing about an axis that is perpendicular to both the axis of the bearing and the axis of the shaft, so that a force component is transmitted from the shaft to the bearing which is manifested by development of a force parallel to the axis of the shaft which tends to effect relative movement between the shaft and frame in directions axially of the shaft, and controller means for selectively effecting subtantially identical pivoting of all bearings simultaneously, and guide means extending parallel to said shaft and spaced therefrom and cooperating with the frame to prevent rotation of the frame relative to the shaft but accommodating movement of the frame axially of the shaft.*

*16. A device as in claim 15 in combination with second control means engaging the controller for selectively moving the controller relative to the frame, and positioning means operatively associated with the second control means for effecting pre-determined positioning of the controller depending upon the location of the frame axially of the shaft.*

*17. A threadless screw device having a shaft and a roller assembly, said roller assembly including a holder and a plurality of rollers mounted in said holder and engaging said shaft, the improvement comprising a carrier for each roller journaled in said holder, said holder providing a bore for each carrier, and said carrier having cylindrical surface portions engaging the wall of said bore at a position which is no farther from the shaft than the axis of the rollers, each roller being rotatably mounted within a carrier and surrounded by said bore, means extending transversely from each carrier for maintaining the axis of each roller in a predetermined angular relationship to a plane which includes the axis of said shaft, and means urging each roller into engagement with the surface of said shaft.*

*18. A threadless screw device as claimed in claim 17 in which said transversely extending means extends in a direction generally transversely of the axis of said shaft, and control means rotatably mounted on said holder and engaging said transversely extending means so that in one angular position of said control means, said shaft axis and the axes of all of said rollers will be parallel to each other, whereby angular adjustment of said control means with respect to said holder will cause a uniform inclination of said roller axes with respect to said shaft axis.*

*19. A threadless screw device as claimed in claim 18 which includes a pin mounted in each carrier, each roller being journaled on a pin, said transversely extending means terminating in a spherical portion, and said control means including a plurality of slotted portions, each one receiving one of said spherical portions.*

*20. A threadless screw device as claimed in claim 17 in which said holder is provided with an opening receiving said shaft, said bores being oriented perpendicular to the axis of said shaft and intersecting same, said bores being of a length greater than the axial length of said carriers, confining means located in each bore outwardly of said carrier, said roller urging means comprising a spring confined between each confining means and the carrier located in said bore.*

*21. A threadless screw device comprising a roller assembly, said roller assembly comprising a holder having an opening for receiving a shaft and a plurality of radially extending bores oriented perpendicular to the axis of said shaft opening and intersecting same, a carrier journaled in each bore for angular adjustment about an axis perpendicular to said shaft opening axis, each carrier having an axial opening, a roller located in said opening and having a portion extending beyond the inner end of said carrier, a pin extending transversely through said carrier and said roller and providing a mounting for said roller, a slot in the wall of each bore, each pin having an extended portion having through one of said slots, said slots extending in a direction substantially transverse to said shaft opening axis and being larger than the diameter of said pin to permit axial and angular displacement of said pin and carrier with respect to the axis of said bore, said holder including a hub, and control means rotatably mounted on said hub and including means engaging said pins whereby angular adjustment of said control means with respect to said hub will cause a uniform inclination of said roller axes with respect to said shaft axis, confining means located in the outer end of each bore, and spring means confined between each confining means and its associated carrier to urge each carrier inwardly in said bore.*

*22. A threadless screw device as claimed in claim 21 in which the engagement of said pin with one wall of the slot limits inward displacement of said carrier by said spring means.*

*23. A threadless screw device having a shaft and a roller assembly, said roller assembly including a holder and a plurality of rollers mounted in said holder and engaging said shaft, the improvement comprising a carrier for each roller journaled in said holder, said holder providing a bore for each carrier and said carrier having cylindrical surface portions engaging the wall of said bore at a point which is no fatrher from the shaft than the axis of the rollers, each roller being rotatably mounted within a carrier and surrounded by said bore, means extending in a direction generally perpendicular to the axis of said shaft, and transversely from each carrier for maintaining the axis of each roller in a predetermined*

*ngular relationship to a plane which includes the axis f said shaft, and means urging each roller into engagement with the surface of said shaft.*

*24. The threadless screw device of claim 23 and further including control means rotatably mounted on said older and engaging said transversely extending means, that angular adjustment of said control means with espect to said holder will cause a uniform inclination of aid roller axis with respect to said shaft axis.*

*25. The threadless screw device of claim 23 wherein aid control means is rotatably mounted about an axis hich is perpendicular to the axis of said shaft.*

References Cited

The following references, cited by the Examiner, are of record in the patented file of this patent or the original patent.

UNITED STATES PATENTS

| | | | |
|---|---|---|---|
| 402,674 | 5/1889 | Judson | 74—25 |
| 2,578,026 | 12/1951 | Taylor | 74—25 |
| 3,424,012 | 1/1969 | Hirmann | 74—25 |

MILTON KAUFMAN, Primary Examiner

W. S. RATLIFF, Jr., Assistant Examiner